Oct. 15, 1968  E. A. WAHL ETAL  3,405,842
GRAVIMETRIC BELT FEEDER

Filed Jan. 4, 1967                                    6 Sheets-Sheet 1

EUGENE A. WAHL,
ARNOLD M. LAWNER,
RALPH J. WINTERS
INVENTORS

BY
*Rudolph J. Jurick*
ATTORNEY

Oct. 15, 1968

E. A. WAHL ETAL 3,405,842

GRAVIMETRIC BELT FEEDER

Filed Jan. 4, 1967

EUGENE A. WAHL,
ARNOLD M. LAWNER,
RALPH J. WINTERS
INVENTORS

BY Rudolph J. Jurick
ATTORNEY

Oct. 15, 1968   E. A. WAHL ETAL   3,405,842
GRAVIMETRIC BELT FEEDER

Filed Jan. 4, 1967   6 Sheets-Sheet 4

EUGENE A. WAHL,
ARNOLD M. LAWNER,
RALPH J. WINTERS
INVENTORS

BY Rudolph J. Juick
ATTORNEY

Oct. 15, 1968  E. A. WAHL ETAL  3,405,842
GRAVIMETRIC BELT FEEDER

Filed Jan. 4, 1967  6 Sheets-Sheet 2

EUGENE A. WAHL,
ARNOLD M. LAWNER,
RALPH J. WINTERS
INVENTORS

BY Rudolph J. Juick
ATTORNEY

United States Patent Office 3,405,842
Patented Oct. 15, 1968

3,405,842
GRAVIMETRIC BELT FEEDER
Eugene A. Wahl, 294 Forest Ave., Glen Ridge, N.J. 07028, and Arnold M. Lawner, Rutherford, and Ralph J. Winters, Nutley, N.J., said Lawner and said Winters assignors to said Wahl
Filed Jan. 4, 1967, Ser. No. 607,207
21 Claims. (Cl. 222—55)

ABSTRACT OF THE DISCLOSURE

Gravimetric feeder apparatus for use with particulated materials. A primary feeder, such as a feeder having an auger driven by a variable speed motor, delivers material onto an endless belt moving at a constant speed and mounted for pivotal displacement about a horizontal axis. A transducer responds to pivotal displacements of the belt and effects operation of control elements for automatically adjusting the speed of rotation of the auger to maintain a constant discharge of the material from an end of the belt at a preset rate.

Background of the invention

Material feeders are used to provide a continuous flow of material into a medium such as, for example, chemicals into a process stream, at a constant predetermined feedrate. Feeders of the class to which this invention is directed are known as gravimetric feeders and the feedrate is defined in terms of the weight of the material discharged per unit of time.

Various gravimetric feeders have been proposed heretofore, but such feeders are incapable of operation at low feedrates with a desired high accuracy as, for example, within ±½% of the preset feedrate, nor are such feeders adaptable for use with certain difficult to handle materials such as flakes of irregular size and shape. The shortcomings of existing gravimetric feeders are overcome by apparatus made in accordance with this invention.

Summary of the invention

Apparatus made in accordance with this invention comprises an endless belt receiving material from a supply source such as a volumetric feeder having a rotatable auger. The belt is driven at a constant speed and is mounted for pivotal displacement about a horizontal pivot axis. The auger is disposed in a discharge tube which is in communication with a supply hopper. Upon rotation of the auger, a stream of material flows out of the discharge tube and onto the belt, which belt transports the material for free fall from one end thereof. Means are provided for balancing the belt, when empty, to provide a reference balance condition of the belt about the horizontal pivot axis. Also, means are provided for nominally setting the speed of auger rotation to supply a continuous flow of material to the belt at a predetermined feedrate. A transducer responds to unbalanced conditions of the belt system about the pivot axis and affects the operation of control elements for continuously adjusting the speed of auger rotation to maintain a predetermined weight of the material on the belt. Read-out means also are provided for continuously indicating the material load on the belt, the correspondence between the preset apparatus feedrate and the actual feedrate at any moment, and for totalizing the weight of material discharged over a given period of time. The construction and assembly of the apparatus is such that it is capable of operating with a great variety of materials at very low feedrates and with an operating accuracy of better than ±½% measured on a minute to minute basis.

An object of this invention is the provision of a gravimetric belt feeder of improved construction and which has a higher operating accuracy, even at low feedrates, than prior feeders of this class.

An object of this invention is the provision of a material feeder having an endless belt driven at a constant speed and mounted for pivotal displacement about a horizontal axis, a primary feeder having a variable feedrate and discharging material onto the belt, and means responsive to pivotal displacement of the belt from a preset balanced condition to automatically control the feedrate of the primary feeder.

An object of this invention is the provision of apparatus for providing a continuous discharge of material at a predetermined feedrate which apparatus comprises an endless belt mounted for pivotal displacement about a horizontal pivot axis spaced from the belt and parallel to the longitudinal belt axis, a constant speed motor mounted for pivotal displacement about said horizontal pivot axis and driving the belt, a supply hopper, a variable speed motor driving an auger for discharge of material from said hopper onto the belt, means for establishing a reference balance condition of the belt, when empty, means for presetting the speed of said variable speed motor for discharge of material onto the belt at a nominal rate corresponding to a desired feedrate of the apparatus, and means responsive to pivotal displacement of the belt to vary the speed of said variable speed motor, thereby to maintain the belt in the reference balance condition.

An object of this invention is the provision of apparatus for discharging particulated material at a constant feedrate, which apparatus comprises a volumetric feeder of the rotatable auger class and having a D.C. drive motor, means directing the flow of material from the volumetric feeder onto an endless belt driven by a constant speed motor, means mounting the belt for pivotal displacement about a horizontal axis, means for establishing a predetermined balance condition of the belt, means providing an electrical signal which varies proportionally with pivotal displacement of the belt from the balance condition, manually-settable means for adjusting the speed of said D.C. motor to provide a nominal flow of material onto the belt in accordance with a desired feedrate of the apparatus, means indicating the load carried by the belt, and means indicating the weight of material discharged by the apparatus over a given period of time.

An object of this invention is the provision of apparatus for use in combination with a volumetric feeder for providing a continuous flow of material at a precise feedrate, which apparatus comprises an endless belt carried by spaced pulleys and adapted to receive material from the volumetric feeder, means supporting the pulleys from a pivot shaft rotatable about a horizontal axis, a motor carried by said pivot shaft and having a drive shaft coupled to one of the pulleys, a load cell providing an electrical output signal which varies in proportion to rotation of the pivot shaft, and manually-adjustable means for establishing a predetermined balance condition of the belt.

The above-stated and other objects and advantages of the invention will become apparent from the following description when taken with the accompanying drawings. It will be understood, however, that the drawings are for purposes of illustration and are not to be construed as defining the scope or limits of the invention, reference for the latter purpose being had to the claims appended hereto.

Brief description of the drawings

In the drawings wherein like reference characters denote like parts in the several views.

*Description of the preferred embodiment*

Figure 1:
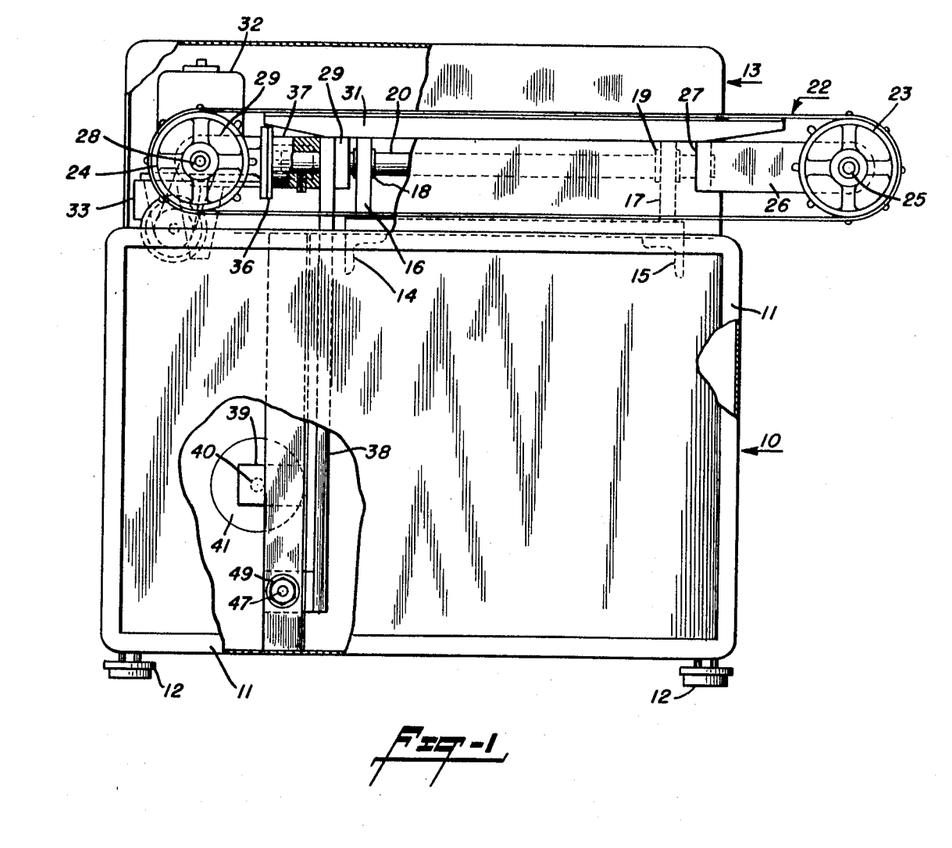
FIGURE 1 is a side elevational view of weigh belt apparatus made in accordance with this invention, portions of the front panel and the cover being broken away.
Figure 2:
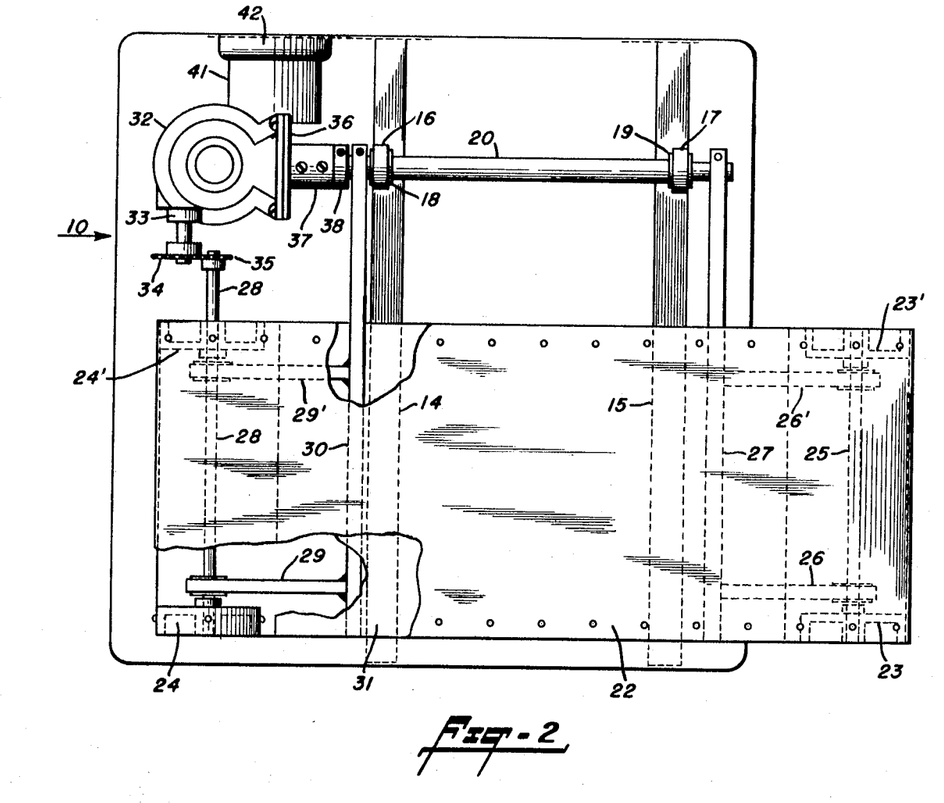
FIGURE 2 is a top plan view thereof with the cover removed and a portion of the belt broken away.
Figure 3:
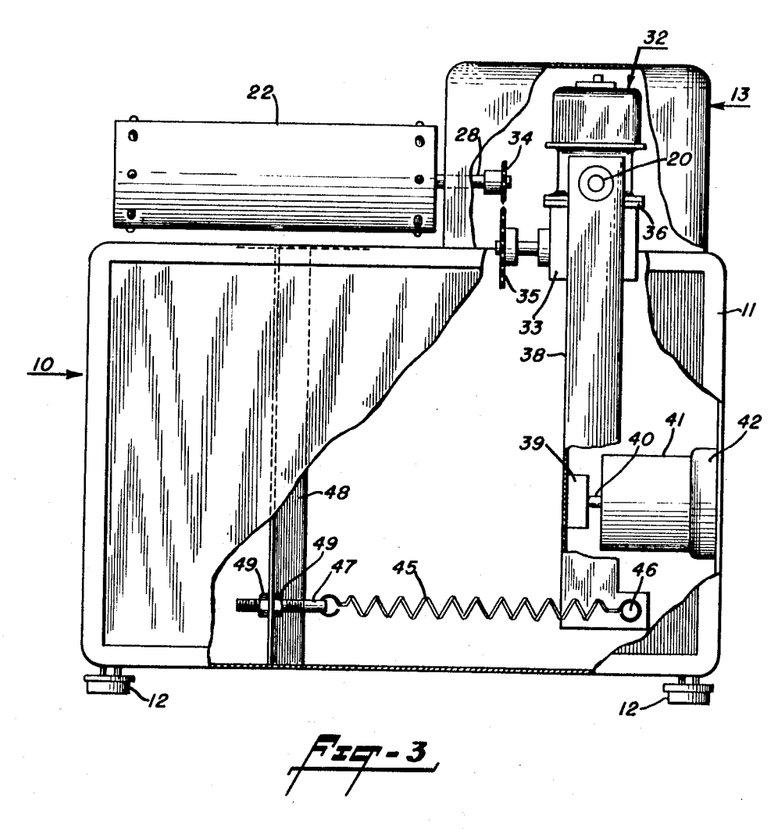
FIGURE 3 is an end elevational view thereof with portions of the side panel and cover broken away.

Reference now is made to FIGURES 1–3 showing the weigh belt apparatus. The operating components are supported on a sturdy base 10 formed of L-shaped angle irons 11 and provided with adjustable feet 12. The base is enclosed on all sides by metal panels and serves as a cabinet for the control elements and circuit, as well as an enclosure for certain mechanical components. A top cover 13 encloses other mechanical components and is removably secured to the top panel of the cabinet. Extending across the top of the cabinet are a pair of angle irons 14, 15 having ends secured to the upper angle irons of the cabinet and serving as supports for the two vertically-extending bearing blocks 16, 17 carrying the bearings 18 and 19. A pivot shaft 20 extends through the bearings, said shaft carrying various parts and constituting the pivot axis for an endless belt 22.

The endless belt 22, provided with marginal sprocket holes, passes around two sets of aligned sprocket pulleys 23, 23' and 24, 24'. The pulleys 23, 23' are secured to the ends of a shaft 25 rotatable in bearings carried by the arms 26, 26' which arms are rigidly secured to a horizontally-extending arm 27 having an end secured to the pivot shaft 20. Similarly, the other sprocket pulleys 24, 24' are secured to a shaft 28 rotatable in bearings carried by the arms 29, 29' attached to the horizontal arm 30 having an end secured to the pivot shaft. A flat plate 31, having down-turned sides secured to the horizontal arms 27 and 30, underlies the upper portion of the belt, thereby to prevent sagging of the belt under the load carried thereby. It will be clear that the belt is rotatable about the sprocket pulleys and, at the same time, the belt, sprocket pulleys and the support plate 31 are pivotally-displaceable as a unit about a horizontal axis defined by the pivot shaft 20.

The belt is driven at a constant speed by a constant speed motor 32 having a built-in gear reducer 33 the output shaft of which is mechanically-coupled to the shaft 28 by a drive chain and sprockets 34, 35, see particularly FIGURES 2 and 3. The base of this motor is removably secured to a mounting plate 36 forming an integral part of the bushing 37 which is secured to the pivot shaft 20 by a plurality of set screws. It is here pointed out that the motor preferably is secured to the pivot shaft in such manner that the motor and gear reducer are substantially statically balanced about the pivot shaft axis. When energized, the motor drives the belt and, at the same time, is pivotally displaceable about the horizontal axis defined by the pivot shaft.

Also secured to the pivot shaft 20 is a rigid operating arm 38 which extends downwardly into the cabinet 10, said arm having secured thereto a metal block 39 for engagement with the operating pin 40 of a load cell 41 mounted on a rigid platform 42 secured to an angle iron of the cabinet, see particularly FIGURE 3. One end of a counter-balancing spring 45 is secured to a stud 46 carried by the offset, lower end of the arm 38, and the other end of the spring is looped through a hole formed in the end of a threaded rod 47 passing through a clearance hole formed in a vertical angle iron 48 the ends of which are secured to the angle irons of the cabinet. This spring, made of a material having a near zero coefficient of thermal expansion, has a long length and is adjustble, by means of the rod 47 and the locking nuts 49, to counter-balance the complete weigh belt system about the pivot shaft 20, thereby to establish a normal, horizontal balance condition of the belt, in which position the block 39 is in engagement with the load cell pin 40. In this normal, or reference, balance condition of the belt, the load cell produces a predetermined output voltage, which voltage thereafter varies in correspondence with pivotal displacements of the belt. As will be described hereinbelow, the output voltage of the load cell affects the operation of control elements for controlling the flow of material from a supply hopper onto the belt in accordance with a preset rate at which the material is to be discharged from an end of the belt.

Figure 4:
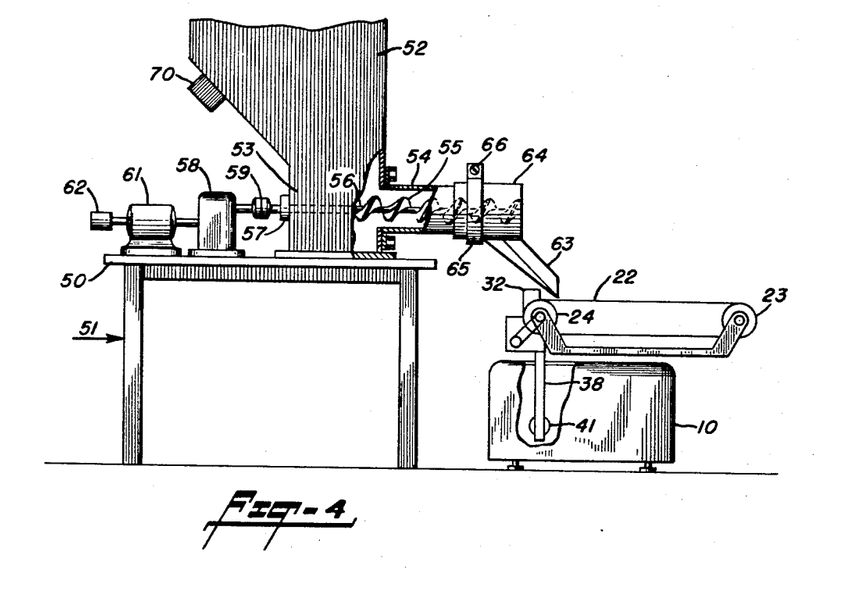
FIGURE 4 is a side elevational view showing a volumetric feeder operatively associated with the weigh belt apparatus, a portion of the volumetric feeder being shown in cross-section and the weigh belt apparatus shown diagrammatically.

Reference now is made to FIGURE 4 wherein the pertinent components of the weigh belt system, namely, the endless belt 22 carried by the sprocket pulleys 23 and 24, the belt drive motor 32, the vertical arm 38 and the load cell 41, are shown diagrammatically. Material can be supplied to the belt from a supply source by any suitable apparatus having an automatically adjustable material discharge rate. In FIGURE 4, there is shown a volumetric feeder of the rotatable auger class carried by a base 50 supported on a stand 51. Such feeder comprises a supply hopper 52 terminating in a trough 53 having an end opening aligned with a discharge tube 54, which tube is removably secured to the trough. An auger 55 extends through the discharge tube and has an end welded to a shaft 56 passing through a bearing 57 and connected to the output shaft of a gear reducer 58 through a flexible coupling 59. In the case of certain materials such as, for example, thin flakes of substantial size, only one or two flights of the auger extend into the trough, thereby eliminating possible compacting of the flakes at the intake end of the discharge tube 54. The input shaft of the gear reducer is connected to the drive shaft of a D.C. motor 61, having a tachometer generator 62 also connected thereto. When the motor is energized, rotation of the auger results in a delivery of material from the hopper onto the belt at a rate depending upon the design constants of the auger and discharge tube and the speed of auger rotation.

Figure 5:
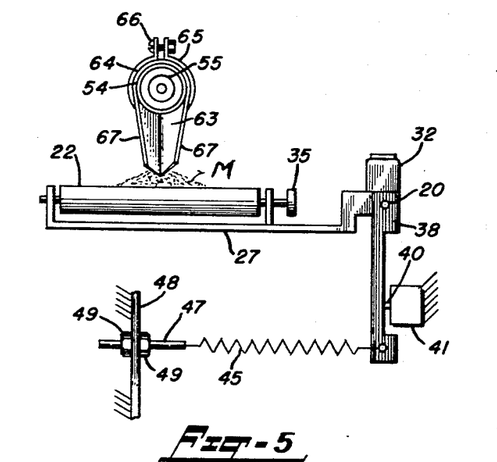
FIGURE 5 is a fragmentary, end elevational view generally corresponding to FIGURE 4.

The material discharged from the end of the discharge tube 54 is directed onto the belt by a delivery chute 63 having a V-shaped bottom and extending from a tube 64 which is adjustably secured to the discharge tube 54 by a band 65 having offset ends clampingly secured together by a fastening screw 66. As shown in FIGURE 5, which is a fragmentary end view generally corresponding to FIGURE 4, the delivery chute 63 has a tapered lower end spaced from the surface of the belt 22, and side walls 67. When the belt is moving, the material, as it is deposited onto the belt, spreads out laterally to form a pile of consistent cross-section. Although not shown in the drawings, conventional, vertical side guides may be used, such guides extending along the upper surface of the belt having lower side walls proximate to the belt surface, thereby to permit a greater depth of material on the belt without overflowing the sides. Preferably, however, the belt has a width substantially exceeding the maximum spread of the particular material as it is transported on the belt. Normally, the delivery chute 63 is aligned with the longitudinal belt axis and the material, identified by the letter M, spreads uniformly to either side of such axis. Since the belt is supported by a lever arm 27, attached to the pivot shaft 20, the pivotal displacement of the belt depends upon the mean distance of the carried material from the axis of such shaft, assuming a given total weight of material is carried on the belt. Assuming, now, that the belt system has been balanced, by adjustment of the spring 45, to provide a predetermined output signal from the load cell 41 when the belt is running empty, it will be apparent that the output signal will vary in accordance with variations in the weight of the material carried on the belt. Such variations in the weight of the material carried by the belt arise by reason of variations in the rate at which material is supplied to the belt by the primary feeder. These variations are compensated for automatically by a control system responsive to the load cell output signal and effecting an appropriate change in the speed of rotation of the auger, as will be described in detail below.

For a given load on the belt, the effective force applied to the pin of the load cell depends upon the distance of the center of gravity of the load from the pivot axis of the system. Thus, the response of the system can be adjusted by rotating the delivery chute 63 about the discharge tube 54, thereby to deposit material onto the belt such that the center of gravity of the deposited material is displaced to one or the other side of the longitudinal axis of the belt. Also, the effective length of the belt can be increased or decreased by adjusting the position of the delivery chute longitudinally of the discharge tube 54. In the described construction of the weigh belt system, the axes of the belt-carrying sprocket pulleys lie in a horizontal plane containing the pivot shaft 20 when the belt is in the balanced condition. Preferably, the end of the operating pin of the load cell lies in a vertical plane passing through the axis of the pivot shaft. During normal operation of the apparatus, the maximum angular displacement of the belt is extremely small, being of the order of only a few minutes of arc, whereby the force exerted against the load cell pin is, for all practical purposes, applied along the pin axis. This results in a maximum uniformity in the load cell response which, obviously, results in high system accuracy. Further, the described, minor angular displacement of the belt from its initially-established horizontal balance condition minimizes the possibility of the center of gravity of the material transported by the belt shifting from the center line as established by the angular orientation of the end of the delivery chute relative to the belt axis.

Summarizing the description to this point, and with specific reference to FIGURES 4 and 5, the material passes from the supply hopper into the trough, said hopper having, if necessary, an electro-magnetic vibrator 70 attached thereto to assure a continuous flow of the material into the trough. Alternatively, the hopper may be vibrated by an electro-mechanical gyrator as is common in this art. The rotating auger 55 provides a metered volumetric flow (V, cubic feet per minute) of the material to the belt which belt provides a gravimetric material flow (G, pounds per minute) at the discharge end thereof. As will be described below, a nominal speed of auger rotation is preset, by manually-adjustable means, so that a given material of known density will be discharged into the process at a desired, precise feedrate measured in pounds per minute. Knowing the density of the particular material and the volumetric flow rate of the auger feeder and the length and speed of travel of the belt, the nominal speed of auger rotation can be established for a desired apparatus feedrate G. This would be equivalent to operation of the auger feeder as an open loop system on a purely volumetric basis. Such normal speed of the auger is preset electrically in the first instance and thereafter changes in the auger speed, in response to unbalanced conditions of the belt, are effected by a closed loop control system including the tachometer generator 62.

Figure 6:
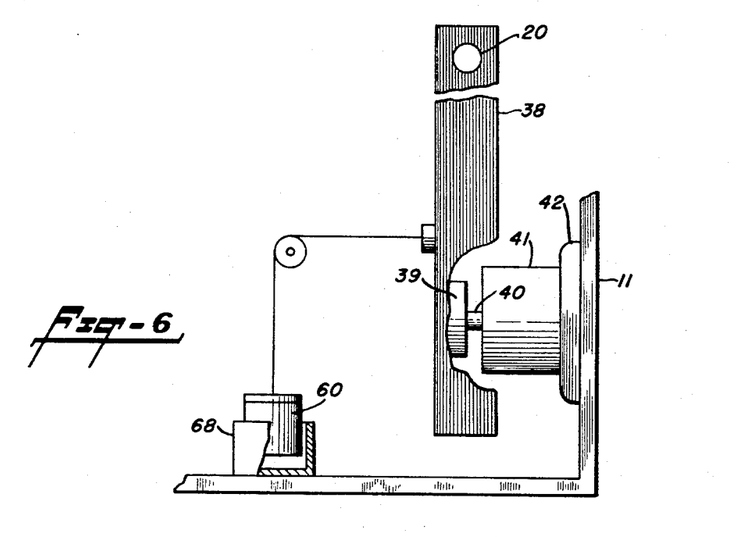
FIGURE 6 is a fragmentary side elevational view showing another arrangement for establishing a reference balance condition of the belt.

Another arrangement for balancing the belt system is shown in the fragmentary view of FIGURE 6. In this arrangement, an adjustable weight 60 is attached to a flexible cord, which cord passes over a freely-rotatable pulley and has an end attached to the operating arm 38 carrying the metal block 39. The lower portion of the weight is slidable within a container 68, the arrangement being such as to provide a damping effect upon oscillations of the belt system. The weight 60 is adjusted to establish a reference balance condition of the belt, in which balance condition the block 39 is in engagement with the load cell pin 40 and the load cell 41 produces a predetermined output voltage, as has been described hereinabove.

Figure 7:
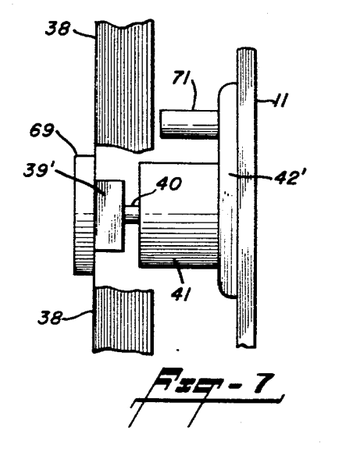
FIGURES 7 and 8 are similar views showing resilient members engaging the operating pin of the load cell.

In the arrangement shown in FIGURE 7, a plate 69 is secured to the side of the operating arm 38 and the force is applied to the load cell pin 40 through a block 39' made of a resilient material, such as soft rubber, which block is cemented to the arm 38 and the plate 69. Such block isolates the load cell pin from vibrations of the weigh belt system and eliminates the need for precise machining at the interface between the load cell pin and the force-transmitting, or address member. Also, and importantly, by using such resilient address member, it becomes practical to provide a positive stop member 71 to prevent damage to the load cell by excessive depression of the pin as would occur, for example, when a heavy weight inadvertently is applied to the belt. The stop member is spaced from the arm 38 to limit the displacement thereof to the allowable limit of pin travel. In a low capacity load cell, it is difficult to provide a positive stop as the maximum allowable pin travel from the no-load to the damaging load position is only of the order of $\frac{1}{32}$ inch. With a resilient block having a thickness of the order of 1 inch, the compression of the block is of the order of $\frac{1}{4}$ inch before the danger point to the cell is reached. Thus, the stop 71 may be spaced from the arm by a distance somewhat less than $\frac{1}{4}$ inch without in any way interfering with the normal operation of the load cell.

Figure 8:
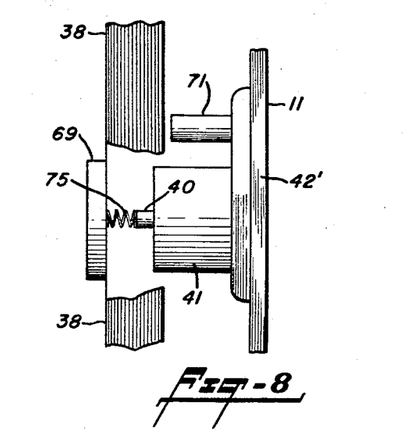

The resilient address member may comprise a coiled spring 75, as shown in FIGURE 8, said spring having an end secured to the plate 69. This arrangement also includes the positive stop member 71.

While the stop member 71, FIGURES 7 and 8, is shown spaced from the operating arm 38, it will be apparent that such member may be spaced from any other rigid part which moves simultaneously with pivotal displacement of the belt about the described horizontal pivot axis.

Figure 9:
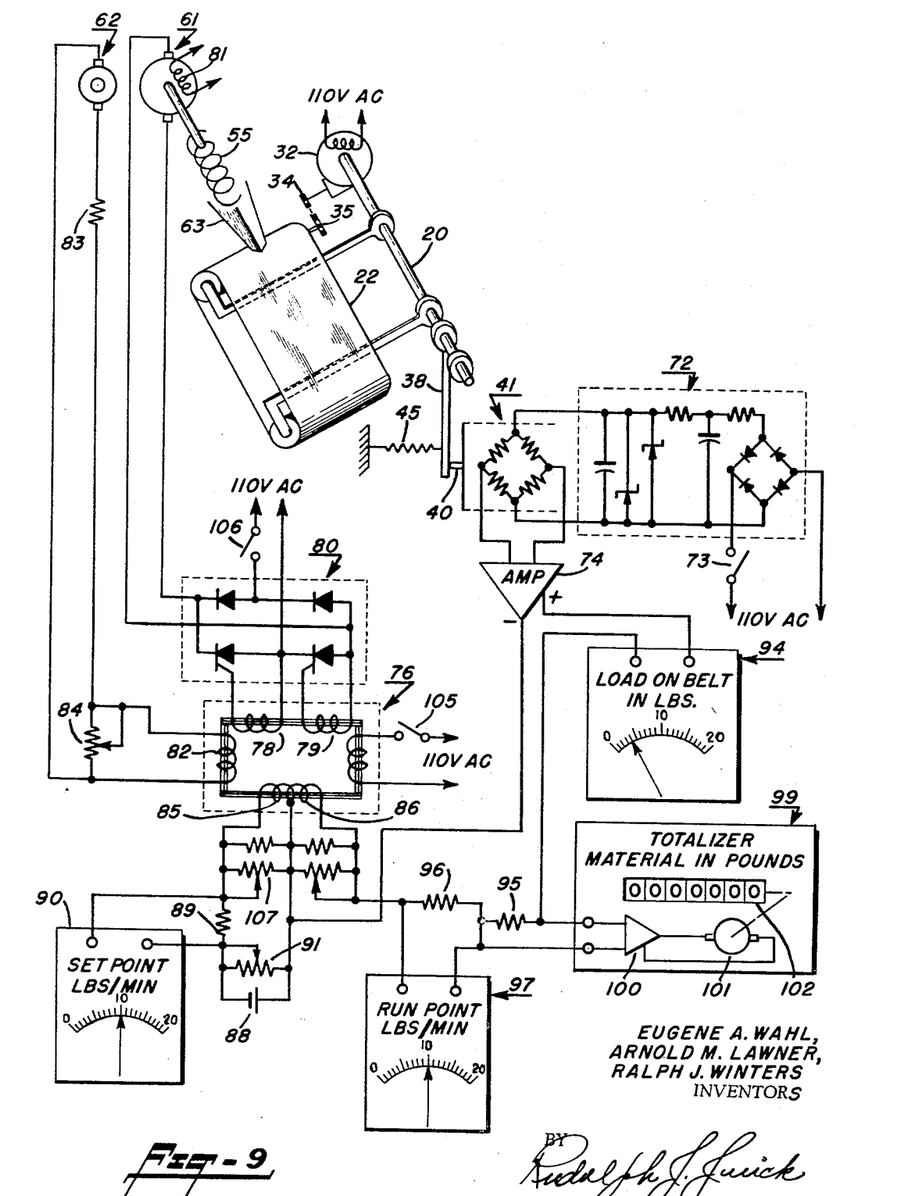
FIGURE 9 is a circuit diagram of the complete apparatus.

Reference now is made to FIGURE 9 which is a circuit diagram of the control apparatus and including diagrammatic representations of the pivot shaft 20, endless belt 22, belt drive motor 32, auger 55, auger drive motor 61, tachometer generator 62 and the delivery chute 63. The load cell 41 comprises a 4-arm resistance bridge energized by a constant D.C. voltage supplied by the conventional power supply 72 upon closure of the switch 73. The output junctions of the load cell are connected to a D.C. amplifier 74. A conventional magnetic amplifier 76 comprises control windings and output windings coupled together magnetically. The two output windings 78 and 79 are connected to two rectifiers of a full wave silicon controlled rectifier 80 having input junctions connected to a source of 110 volts A.C. and output junctions connected to the armature of the auger drive motor 61, which motor has a field winding 81 energized by a constant D.C. voltage. Those skilled in this art will understand that voltage applied to the armature is proportional to the phase relationship and duration, taken with respect to the frequency of the 110 volts A.C. line, of the switching voltages generated in the output windings 78 and 79. One control winding 82, of the magnetic amplifier, is connected to the tachometer generator 62 in series with a current limiting resistor 83 and in parallel with an adjustable resistor 84. The other control winding comprises a center-tapped coil forming the windings 85 and 86. The control effect of the switching voltages developed in the output windings 78 and 79 depends upon the product of the ampere turns of the control windings and, given a known number of turns forming these windings, the control effect of the switching voltages is determined by the magnitude and direction of the D.C. current flowing through these control windings.

A precision voltage source 88, such as a standard voltage cell, is connected to the control winding 85 through a fixed resistor 89, and the voltage drop across this resistor energizes a D.C. multivoltmeter 90 having a scale calibrated in pounds per minute. The voltage drop across the resistor 89 and, consequently, the current flowing in the winding 85 is controlled by the setting of the potentiometer 91. A desired apparatus feedrate is preset by adjusting the potentiometer 91 until the pointer of the meter 90 is aligned with a corresponding scale mark.

The output of the D.C. amplifier 74 is applied to the magnetic amplifier control winding 86 through a D.C. microammeter 94 and the two fixed resistors 95 and 96, the meter 94 having a scale calibrated in terms of the material load on the belt. The meter 97 is a millivoltmeter energized by the voltage drop across the resistor 96 and has a scale similar to that of the millivoltmeter 90. The totalizer 99 is an integrating device of conventional construction comprising a D.C. amplifier 100 having its input circuit connected across the resistor 95 and its output driving a variable speed motor 101 coupled to the shaft of a revolution counter 102. Thus, the voltage driving the motor 101, varies in correspondence with the apparatus feedrate in pounds per minute and the counter indicates the total weight of the material delivered over a given period of time.

The operating constants of the weigh belt system are fixed. Specifically, the speed of travel of the belt is constant, being determined by the output shaft speed of the constant speed motor 32 and the ratio of the sprockets 34 and 35. Also, the effective length of the belt is known, such length being the distance between the end of the delivery chute 63 and the material discharge end of the belt. In the following discussion, it will be assumed that the belt has an effective length of 2 feet and a speed of 5 feet per minute. Thus, if the weight of material carried by the belt is 4 pounds, the apparatus will have a gravimetric feedrate G of 10 pounds per minute. In order to maintain this feedrate, the volumetric feeder must deliver material onto the belt at an appropriate volumetric feedrate V, said feedrate V being higher or lower than the feedrate G depending upon, among other factors, the density of the particular material. The operating constants of the volumetric feeder are fixed with the exception of the speed of auger rotation. It is only necessary, therefore, that the volumetric feeder be capable of delivering a particular material onto the belt at a volumetric feedrate sufficient to maintain the maximum, desired gravimetric feedrate of the apparatus. In the apparatus shown in FIGURE 8, the maximum gravimetric feedrate is 20 pounds per minute, as indicated by the scales of the meters 90, 94 and 97.

It will now be assumed that a desired gravimetric feedrate is 10 pounds per minute. Since the belt travels at a speed of 5 feet per minute, 4 pounds of the material must be distributed along the effective length of the belt. The reference balance condition of the belt, when empty, is established by adjustment of the spring 45. In such reference balance condition of the belt, the arm 38 depresses the load cell pin so that the output voltage of the cell is a predetermined value, which value constitutes the electrical balance point of the control system, thereby eliminating ambiguity of operation as would be the case with a zero electrical balance point. The movable elements of the indicating meters are suppressed, mechanically, to compensate for the stated electrical balance point of the system, that is, the pointers of the meters are aligned with the zero marks of the associated scales when the belt is in the reference balance condition.

The potentiometer 91 now is adjusted until the setpoint meter 90 indicates 10 on the scale, such indication corresponding to the desired gravimetric feedrate of the apparatus. This results in a current of predetermined magnitude flowing through the control winding 85 of the magnetic amplifier 76. Upon closure of the switch 105, the switching signals generated in the output windings 78 and 79 are of such character that, upon closure of the switch 106, a D.C. voltage of proportional magnitude is applied to the armature of the auger drive motor 61 by the rectifier 80. Rotation of this motor results in a flow of material onto the belt and the generation of a D.C. voltage by the tachometer generator 62, the latter voltage being applied to the magnetic amplifier control winding 82 to maintain a nominal speed of rotation of the motor 61. As the weight of the material on the belt increases, the belt is displaced about the axis of the pivot shaft 20 resulting in an increased voltage output from the load cell and a corresponding increase in the output of the amplifier 74, the latter resulting in an increase in the current flowing through the microammeter 94, the fixed resistors 95 and 96 and the magnetic amplifier control winding 86. The pointers of the meters 94 and 97 deflect upscale and the counter of the totalizer 102 rotates. When the weight of the material on the belt equals 4 pounds, the ampere-turns product of the winding 86 opposes that of the winding 85 and the auger drive motor runs at a commanded speed such that the material delivery to the belt is at a volumetric feedrate necessary to maintain the preset gravimetric feedrate of the apparatus. The commanded volumetric feedrate will depend upon the density of the particular material. The nominal speed of the auger drive motor can be adjusted by means of the potentiometer 107 thereby to provide an initial correspondence between the volumetric rate at which material is delivered onto the belt and the gravimetric rate at which material is discharged from the belt. This initial correspondence between the two feedrates is established by reference to the meter 94, the pointer of which should be aligned with the 4 pound scale mark under the stated conditions. During normal operation of the apparatus, pivotal displacements of the belt result in changes in the output signal of the load cell, thereby increasing or decreasing the current flowing through the control winding 86 of the magnetic amplifier and resulting in a proportionate decrease or increase in the speed of rotation of the auger. Although not shown in the drawing, the totalizer 99 is provided with a timing mechanism which can be preset to discontinue the counting operation after a predetermined time interval, after which the counter must be reset to zero to condition the device for a repeat of the counting operation.

Having now described the invention those skilled in this art will be able to make various changes and modifications without thereby departing from the spirit and scope of the invention as recited in the following claims.

What is claimed is:
1. Apparatus comprising,
  (a) an endless belt mounted for pivotal displacement about a horizontal axis,
  (b) a motor for driving the belt at a constant linear speed,
  (c) means for establishing a reference balance condition for the belt,
  (d) transducer means responsive to pivotal displacement of the belt and providing an electrical signal which varies proportionally with pivotal displacement of the belt, said transducer means comprising a load cell energized by a constant D.C. voltage and including an operating pin having an end lying in a vertical plane containing the said horizontal axis, and
  (e) an operating arm engaging the said end of the pin and mounted for simultaneous pivotal displacement with the belt.

2. The invention as recited in claim 1, wherein the said horizontal axis is spaced to one side of the belt and parallel to the longitudinal belt axis.

3. The invention as recited in claim 2, including means mounting the said motor for pivotal displacement about the said horizontal axis, said motor being substantially statically balanced about said horizontal axis.

4. The invention as recited in claim 1, in combination with a material supply hopper, variable delivery means for discharging material from the hopper onto the belt, and control means responsive to the said electrical signal and controlling operation of said variable delivery means, thereby to vary the rate at which material is discharged onto the belt.

5. Apparatus for discharging material at a predetermined gravimetric feedrate comprising,
(a) a volumetric feeder comprising a material supply hopper and an auger rotatable by a variable speed motor,
(b) a gravimetric feeder comprising an endless belt driven by a constant speed motor, said belt being positioned to receive material discharged from the volumetric feeder upon rotation of the auger,
(c) a pivot shaft disposed parallel to the longitudinal axis of said belt,
(d) means for establishing a reference balance condition of the belt,
(e) a pair of spaced supports secured to said pivot shaft, said supports carrying rotatable pulleys around which the said belt extends,
(f) a bushing member secured to the pivot shaft and to the housing of said constant speed motor, said motor being substantially statically balanced about the axis of the pivot shaft,
(g) a transducer means responsive to pivotal displacement of the belt about the axis of the said pivot shaft said means providing an electrical signal which varies in magnitude in correspondence with pivotal displacement of the belt,
(h) manually-adjustable means,
(i) means energizing the variable speed motor by a voltage having an initial magnitude depending upon the setting of said manually-adjustable means, and
(j) control means responsive to the said electrical signal and changing the magnitude of the energizing voltage applied to the variable speed motor from the said initial magnitude in correspondence with pivotal displacement of the belt from the reference balance condition.

6. The invention as recited in claim 5, including a delivery chute on the volumetric feeder, said chute being adjustable to direct the flow of material onto a predetermined portion of the belt.

7. The invention as recited in claim 5, including operating means secured to the pivot shaft, and wherein the said transducer means comprises a load cell having an operating pin in engagement with said operating means, said load cell being energized by a constant D.C. voltage and producing a D.C. output voltage which varies proportionally with the pressure exerted against the operating pin by said operating means, said output voltage constituting the said electrical signal.

8. The invention as recited in claim 7, wherein the point of engagement of the said operating means and operating pin lies in a vertical plane containing the pivot shaft axis.

9. The invention as recited in claim 7, wherein the said operating means comprises an elongated arm carrying a resilient member which is in engagement with the load cell operating pin.

10. The invention as recited in claim 9, wherein the said resilient member is a block of soft rubber.

11. A gravimetric material feeder comprising,
(a) an endless belt carried by spaced pulleys,
(b) a horizontally-disposed pivot shaft supported by bearings,
(c) support means secured to said pivot shaft and carrying the said pulleys,
(d) a constant speed motor mounted on said pivot shaft and having a drive shaft mechanically-coupled to one of the said pulleys,
(e) an operating member secured to the pivot shaft,
(f) a bridge-type load cell having input junctions connected to a constant D.C. voltage source, said load cell having an operating pin engaged by said operating member,
(g) adjustable means for counterbalancing the members carried by the pivot shaft to thereby establish a reference balance condition of the belt,
(h) a magnetic amplifier having a pair of output windings and first, second and third control windings,
(i) a full wave controlled rectifier having input junctions connected to the output windings of the magnetic amplifier,
(j) a D.C. amplifier having an input circuit connected to the output junctions of the load cell and an output circuit connected to the said first control winding,
(k) a second constant D.C. voltage source,
(l) circuit elements including a potentiometer connecting said second voltage source to the said second control winding,
(m) a volumetric feeder comprising a supply hopper and an auger rotatable by a D.C. motor, said auger being disposed in a discharge tube communicating with the hopper and said discharge tube being positioned to direct a flow of material onto the endless belt upon rotation of said auger,
(n) circuit elements connecting said D.C. motor to the output junctions of said controlled rectifier,
(o) a D.C. voltage generator mechanically-coupled to the shaft of said D.C. motor, and
(p) circuit elements connecting said generator to the said third control winding.

12. The invention as recited in claim 11 wherein the axis of said discharge tube coincides substantially with the longitudinal axis of the belt, and including a delivery tube carried by said discharge tube, said delivery tube being angularly adjustable relative to the discharge tube.

13. The invention as recited in claim 11, including a first fixed resistor connected in the circuit between the said second voltage source and the said second control winding and an electrical voltmeter connected across said first fixed resistor and having a scale calibrated in factors of gravimetric feedrates.

14. The invention as recited in claim 13, including an electrical ammeter connected in series between the output circuit of said D.C. amplifier and the said first control winding, said ammeter having a scale calibrated in factors of material weight.

15. The invention as recited in claim 14, including a second fixed resistor connected in series between the output circuit of said D.C. amplifier and the said first control winding, and a second voltmeter connected across the said second fixed resistor and having a scale calibrated in factors of gravimetric feedrates.

16. The invention as recited in claim 14, including a second fixed resistor connected in series between the output circuit of said D.C. amplifier and the said first control winding, a second D.C. amplifier having an input circuit connected across said second fixed resistor, a second D.C. motor energized by the output voltage of said second D.C. amplifier, and a revolution counter having a shaft mechanically-coupled to the drive shaft of said second D.C. motor.

17. The invention as recited in claim 11, wherein the said pivot shaft is spaced to one side of the endless belt and wherein the point of engagement between the said operating arm and the pin of the load cell lies in a vertical plane containing the rotation axis of the said pivot shaft.

18. The invention as recited in claim 11, including a resilient member carried by the said operating member, which resilient member is in engagement with the operating pin of the load cell.

19. The invention as recited in claim 18, wherein the said resilient member is a block of soft rubber.

20. The invention as recited in claim 18, wherein the said resilient member is a spring.

21. The invention as recited in claim 18, including a positive stop member positioned to limit the extent to which the operating pin of the load cell can be displaced by the said operating member.

References Cited

UNITED STATES PATENTS

| 2,539,070 | 1/1951 | Gebo | 222—57 X |
| 2,609,965 | 9/1952 | Kast | 222—55 |
| 3,087,652 | 4/1963 | Smtih | 222—55 |
| 3,162,325 | 12/1964 | Hall et al. | 222—55 |

ROBERT B. REEVES, *Primary Examiner.*

HADD S. LANE, *Assistant Examiner.*